United States Patent [19]

Govzman et al.

[11] 4,022,425

[45] May 10, 1977

[54] HYDRAULIC CONTROL VALVE

[76] Inventors: Boris Izrailevich Govzman, prospekt Lenina, 64a, kv. 154; Ernst Aggeevich Ogloblin, ulitsa Krasnoarmeiskaya 12, kv. 9, both of Kharkov, U.S.S.R.

[22] Filed: Oct. 3, 1975

[21] Appl. No.: 619,353

Related U.S. Application Data

[63] Continuation of Ser. No. 463,790, April 24, 1974, abandoned.

[52] U.S. Cl. .............................. 251/324; 137/625.69
[51] Int. Cl.² .................... F16K 3/24; F15B 13/042
[58] Field of Search ................ 137/625.34, 625.67, 137/625.69; 251/324

[56] References Cited

UNITED STATES PATENTS

| 3,435,851 | 4/1969 | Olmsted | 137/625.48 |
| 3,530,883 | 9/1970 | Karmer | 137/625.69 X |
| 3,565,115 | 2/1971 | Beckett et al. | 137/625.69 |
| 3,605,809 | 9/1971 | Thorson | 137/625.69 X |

*Primary Examiner*—Alan Cohan
*Assistant Examiner*—Gerald A. Michalsky

[57] ABSTRACT

In a hydraulic control valve a spool accommodating bore of a valve body has eccentric circular grooves. Hydraulic resistance to the fluid flow in shallow portion of the grooves is more than that in deep portions, owing to which the fluid flow by-passes the high-resistance zones in the shallow portions, so that the total hydraulic resistance and the path of the fluid flow through the valve is reduced.

2 Claims, 3 Drawing Figures

HYDRAULIC CONTROL VALVE

This is a continuation of the parent application Ser. No. 463,790, filed Apr. 24, 1974, now abandoned.

This invention relates to hydraulic apparatus and has particular reference to hydraulic control valves.

It can be used to advantage in applications were directional control of hydraulic fluid has to be effected between the source of hydraulic pressure and hydraulically operated equipment. Particular advantage can be gained in applications where spool-type hydraulic control valves are used to operate various actuating mechanisms, for example hydraulic cylinders, of pressing and forging machines, machine tools and other machinery.

It is well known to use hydraulic control valves comprising a body with a cylindrical bore accommodating a sliding spool and having axially spaced circular grooves communicating with respective inlet and outlet passages.

Usually hydraulic control valves handle such fluids as mineral oils, emulsions and various synthetic substances. A hydraulic control valve incorporated in the hydraulic system of a machine offers resistance to the flow of the hydraulic fluid, and therefore part of the power transmitted to the machine is expended to overcome this resistance.

Hydraulic control valves are classified according to the number of hydraulic fluid passages or ways provided in the valve body, being referred to as one-way, two-way, three way valves and so on. For example, a three-way control valve has one passage for the hydraulic fluid to flow to the spool and two passages for the fluid to flow to two actuating mechanisms. A four-way control valve has one passage for the hydraulic fluid to flow to the spool, two passages for the fluid to flow to the actuating mechanisms and one passage for the fluid to return from the actuating mechanisms. A five-way control valve has one return passage more than a four-way valve. Four- and five-way control valves are used most widely.

The quantity of circular grooves in the control valve body corresponds with the total number of the inlet and outlet passages. In the hydraulic control valves known in the art the circular grooves are concentric to the spool accommodating bore. The spool has circular lands the diameter of which is slightly less than the diameter of the bore for the spool to slide freely. The recessed portions of the spool between the lands are referred to as necks.

The number of the spool lands and the distance between them are chosen to suit the hydraulic system concerned. The various combinations of the relative positions of the spool lands and the valve body grooves determine the mode of operation of the actuating mechanisms controlled by the valve involved. Depending on the number of spool positions in the valve body, control valves are called two-position, three position and so on.

For example, in a three-position hydraulic control valve the spool has one centre or initial position and two shifted positions. To return the spool into the centre position after it has been shifted to effect the control functions of the valve, provision is made of springs which bear against the spool at one end and against the valve body cover at the other. The spool is shifted under fluid pressure, by mechanical action or electromagnetically.

For example, in a five-way hydraulic control valve, when the spool is in the centre position, the central passage communicating with the fluid inlet passage can be either open for the fluid to pass between the spool lands to the neighbouring passages, or closed by the spool land, or else open for the fluid to travel only to one of the passages. On the other hand, the circular grooves, which communicate with the fluid outlet passages, can be either open for the fluid to pass to the return passages or isolated from them. The various combinations of the relative positions of the spool lands and valve body grooves determine the flow of the hydraulic fluid through the control valve with the spool in the centre position.

When such a hydraulic control valve operates, the fluid flowing through the inlet passage into the central passage flows between the spool and the bore surface into the adjacent passage which communicated with the outlet passage. From there the fluid is supplied to the actuating hydraulic mechanism, say, a hydraulic cylinder. The piston moving by the action of hydraulic pressure built in one end of the cylinder forces out the fluid from the other end of the cylinder. This expelled fluid flows into the other circular groove communicating with the central passage and flows to the return line.

Since the circular grooves in the body of the control valves known in the art are concentric with the spool accommodating bore, the fluid coming through the inlet passage has to flow part way round the circular groove, passes through the annular space between the spool neck and the bore surface into the adjacent circular groove, flows round it, and thereafter reaches the outlet passage. Thus, the fluid path through the control valve has turns and restrictions which cause local hydraulic resistance, part of the power transmitted to the machine involved being expended to overcome this resistance. This disadvantage results in material loss of fluid head in the control valve with consequent reduction of the rate of fluid flow through the control valve, which, in turn, slows down the response to the control.

It is an object of the present invention to provide a hydraulic control valve featuring increased rate of fluid flow without increase in the valve overall dimensions and cross-sectional area of the passages.

This and other objects are achieved in a hydraulic control valve comprising a body with a cylindrical bore accommodating a sliding spool and having axially spaced circular grooves communicating with respective inlet and outlet passages, wherein these grooves are made eccentric to the axis of the cylindrical bore. The fluid inlet and outlet passages connect to their respective circular grooves at their deep (or most eccentric) portions, owing to which the hydraulic resistance in the shallow portions of the grooves is over three times greater than the hydraulic resistance in the deep portions thereof, and is sufficient to cause the hydraulic fluid to by-pass any high-resistance zone in flowing from the inlet to the outlet.

This constructional arrangement shortens the path of the hydraulic fluid through the control valve body and, consequently, reduces hydraulic resistance to the fluid flow, thereby increasing the rate of fluid flow through the control valve.

It is desirable that the eccentricity of the circular grooves satisfy the following condition $e/R - r = 0.2$ to $0.9$ where
- $e$ = the eccentricity of the circular grooves,
- $R$ = the radius of the circular grooves,
- $r$ = the radius of the spool accommodating bore.

The minimum value of this ratio is correlated with creating in the shallow portions of the circular grooves a high hydraulic resistance sufficient to cause the hydraulic fluid to bypass the high-resistance zone. The maximum value of this ratio is correlated with providing the necessary clearance between the spool lands and the bore surface in order to preclude frictional drag on the spool.

Now the invention will be described in detail with reference to the accompanying drawings in which:

FIG. 2 is a sectional view on the line II—II of FIG. 1; and

FIG. 3 is a sectional view on the line III—III of FIG. 1.

Figure 1:
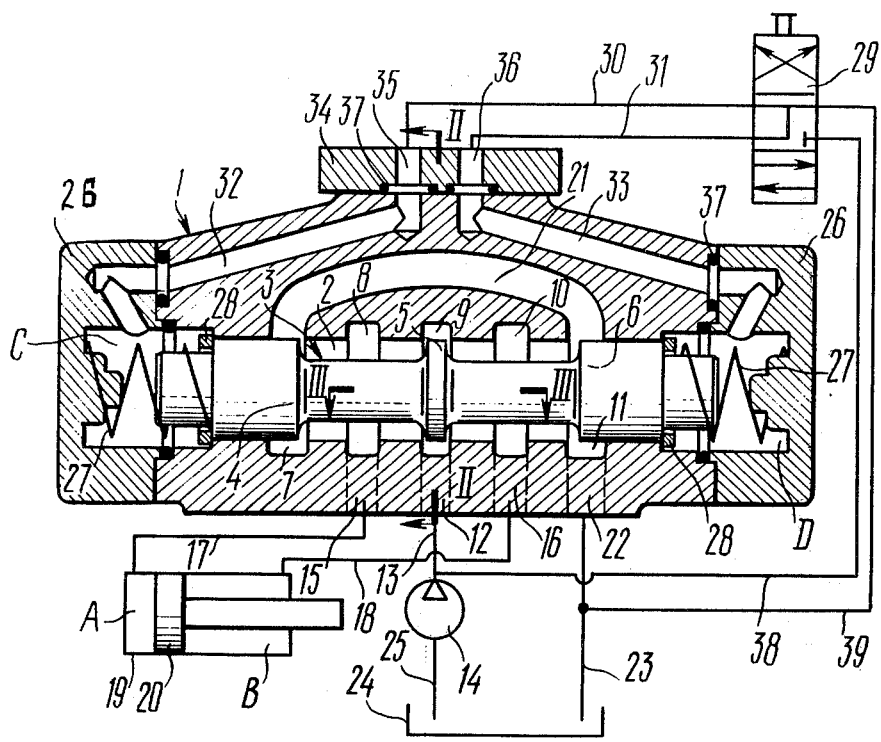
FIG. 1 shows a longitudinal sectional view of the hydraulic control valve and a schematic diagram of the associated hydraulic system.

A four-way, three-position hydraulic control valve constructed according to the invention is considered by way of an example. The shifting of the control valve spool is effected by hydraulic pressure. The valve is employed to control the operation of a press hydraulic cylinder and is incorporated in the hydraulic system of the press.

The hydraulic control valve has a body 1 (FIG. 1) which is essentially a casting with a through cylindrical bore 2 accommodating a spool 3. The spool 3 is recessed to form lands. For the spool 3 to slide freely in the bore 2, the diameter of the spool lands is slightly less than that of the bore. The number of lands provided on the spool 3 determines the number of the positions that the spool can have in the bore 2 during the operation of the hydraulic control valve. With a three-position embodiment, the spool 3 has three lands, 4, 5 and 6. The land 5 is located approximately halfway along the spool 3. The extreme lands 4 and 6 are integral portions of the spool 3. The spool portions between the lands form necks so that there is an annular space between each neck and the surface of the bore 2. The cross-sectional area of the annular space is chosen to suit the rate of fluid flow through the control valve.

Circular grooves 7, 8, 9, 10 and 11 are formed in the bore 2. The grooves are spaced axially, the amount of spacing depending on the stroke of the spool 3. The groove 9 is located approximately half-way along the bore 2. The grooves 7, 8, 9 and 11 are spaced axially, being located symmetrically in relation to the groove 9.

Each of the grooves 7, 8, 9, 10 and 11 is formed eccentric to the axis of the bore 2 (the eccentricity "$e$" is shown in the vertical sectional FIG. 2) so that the hydraulic resistance in the shallow (or least eccentric) portion of each groove is over three times greater than the hydraulic resistance in the deep (or most eccentric) portion thereof. It can be seen from the horizontal sectional view of FIG. 3 that the deep (actually wider) portions of grooves 8, 10, identified by numerals 15, 16, are on the side of the spool 3 opposite to that, numbered 12, of the groove 9. The latter accommodates the land 5. Fluid passages provided in the valve body 1 connect with each respective groove at its deep (or most eccentric) portion. The fluid passage 12 connects with the groove 9 and communicates through a pipeline 13 (FIG. 1) with the source of hydraulic pressure, in this case a pump 14. The passage 12 delivers fluid to the spool 3. The passages 15 and 16 connect with the grooves 8 and 10 respectively and communicate through pipelines 17 and 18 with the spaces A and B or a hydraulic cylinder 19. The hydraulic cylinder 19 comprises a piston 20 which is the operating element of the press. The passages 15 and 16 deliver the hydraulic fluid to the cylinder 19.

The grooves 7 and 11 are interconnected by a passage 21 provided in the control valve body 1. A passage 22 connects with the groove 11 and communicates through a pipeline 23 with a tank 24 which receives the hydraulic fluid returning from the spaces A and B of the hydraulic cylinder 19. The pump 14 is connected to the tank 24 by a pipeline 25.

The bore 2 in the valve body 1 is closed by covers 26, one at each end. Each cover 26 has a cylindrical recess to seat a spring 27 arranged to hold the spool 3 in the centre or initial position. One end of each spring 27 fits onto the bottom of the recess in the cover 26 and the other end bears against a washer 28 fitted on the spool 3. The tension of springs 27 is chosen in accordance with the forces acting upon the spool 3 during the operation of the hydraulic control valve.

The recesses in the covers 26 and the end portions of the bore 2 form closed chambers, viz., a left-hand (as shown) chamber C and a right-hand chamber D.

The spool 3 is operated by a control apparatus 29 which is a manual pilot valve essentially similar in construction to the hydraulic control valve constituting the present invention. The control apparatus 29 is connected by pipelines 30 and 31 to the passages 32 and 33 respectively. The passages 32 and 33 are symmetrically arranged in the valve body 1 and in the covers 26 and serve the purpose of supplying the hydraulic fluid into the chambers C and D in order to shift the spool 3.

The pipelines 30 and 31 are connected to the passages 32 and 33 by means of a junction block 34. Passages 35 and 36 in the junction block 34 match up with the passages 32 and 33. The joints between the passages in the junction block and the valve body are made tight by means of sealing rings 37. The junctions of the passages 32 and 33 between the valve body 1 and the covers 26 are also made tight by sealing rings 37.

The control apparatus 29 receives fluid from the pump 14 through a pipeline 38. The fluid returns from the control apparatus 29 into the tank 24 through a pipeline 39.

Figures 2, 3:
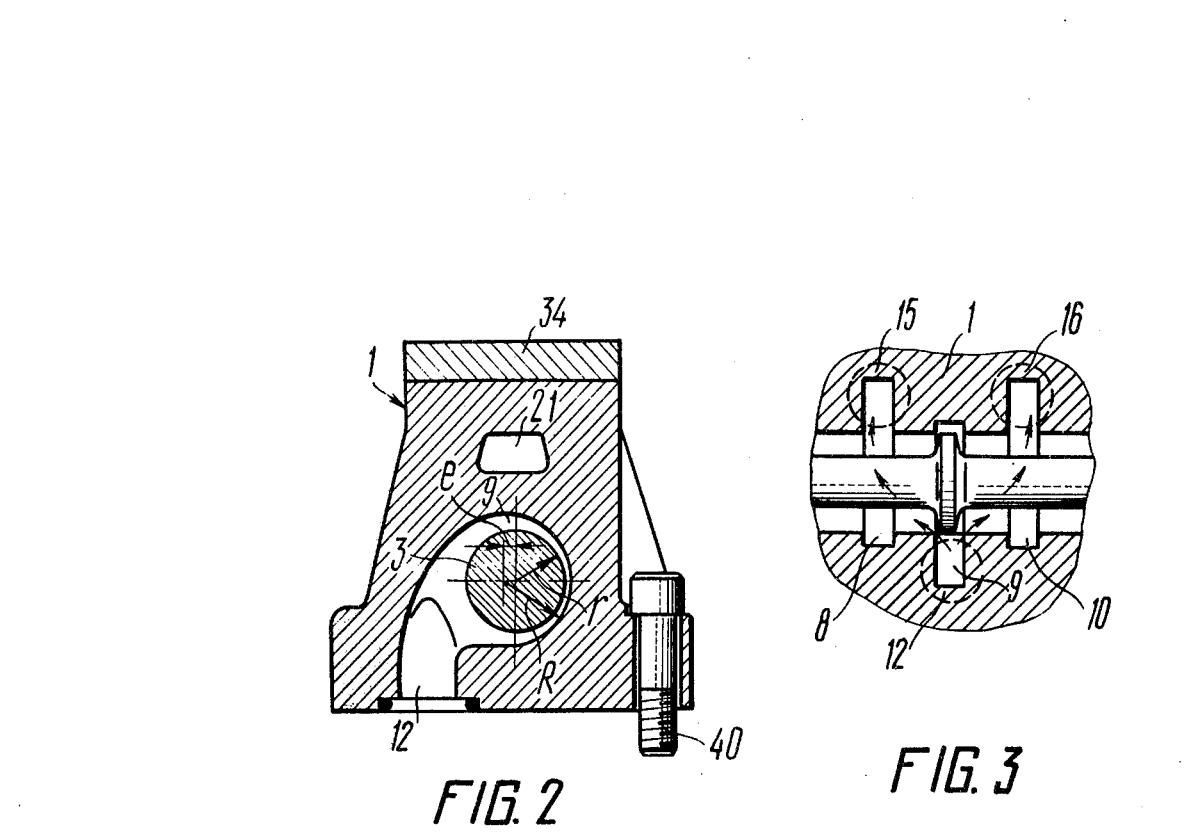

The control valve body has holes for mounting bolts 40 (FIG. 2).

When the hydraulic system is out of operation, the spool 3 is positioned in the bore 2 as shown in FIG. 1. The control apparatus 29 is off. The chambers C and D are connected by the passages 32 and 33 and pipelines 30 and 31 with the passages in the control apparatus 29. Said passages in the apparatus 29 are, in turn, connected to the tank 24 by the pipeline 39. The springs 27 hold the spool 3 in the centre position as shown in the drawing.

The hydraulic control valve operates as follows. The pump 14 is put into action and draws the hydraulic fluid from the tank 24 through the pipeline 25, delivering it through the pipeline 13 into the passage 12 which connects with the circular groove 9 at its deep portion. Since the groove 9 is eccentric to the axis of the bore 2, there is a high-resistance zone in its shallow portion wherein the hydraulic resistance to the fluid flow is much greater than in the deep portion.

Therefore the fluid passes from the groove 9 into the annular space between the spool land 5 and the walls of the groove 9, by-passing the high-resistance zone as shown in FIG. 3. Then the fluid passes through said annular space and through the clearance between the surface of the bore 2 and the necks of the spool 3 into the grooves 8 and 10, substantially by-passing the high-resistance zone in each of these grooves.

From the grooves 8 and 9 (FIG. 1) the fluid flows through the respective passages 15 and 16 and pipelines 17 and 18 into the spaces A and B of the hydraulic cylinder 19.

Thus, owing to the eccentricity of at least the circular grooves 8, 9 and 10, the path of the fluid through the control valve is shortened and thereby the hydraulic resistance to the fluid flow is decreased.

Passing through the spaces between the surface of the bore 2 and the necks of the spool 3, part of the fluid gets into the grooves 7 and 11. The fluid from the groove 7 flows through the passage 21 and together with the fluid already in the groove 11 passes through the passage 22 and the pipeline 23 into the tank 24.

The creation of the high-resistance zone in each of the circular grooves 7, 8, 9, 10 and 11 is correlated with their eccentricity "e" which must satisfy the following condition $$e/R - r = 0.2 \text{ to } 0.9$$

where

R = the radius of the circular groove,
r = the radius of the valve body bore.

After the spaces A and B or the hydraulic cylinder 19 have been filled with the fluid, the control apparatus 29 is turned on, whereby the pipeline 30 is connected with the pipeline 38 and the pipeline 31 is connected with the pipeline 39. The fluid delivered by the pump 14 passes through the pipeline 38, the passages in the control apparatus 29, the pipeline 30 and the passages 35 and 32 into the space C.

The fluid pressure forces the spool 3 to move against the spring 27 to the right until it rests against the right-hand cover 26. In this position, the land 5 on the spool 3 is mid-way between the grooves 9 and 10, separating them, and the land 4 closes the groove 7 and the land 6 opens the groove 11. The fluid delivered by the pump 14 through the pipeline 13 flows through the passage 12 into the groove 9 and thence through the space between the surface of the bore 2 and the left hand neck of the spool 3, into the groove 8, bypassing the high-resistance zone in each of the grooves 8 and 10. From the groove 8 the fluid flows into the passage 15 wherefrom it is delivered through the pipeline 17 into the space A of the hydraulic cylinder 19. The fluid pressure forces the piston 20 to move to the right, making a working stroke. During this stroke of the piston 20 the fluid contained in the space B of the hydraulic cylinder 19 is forced out and delivered through the pipeline 18 and the passage 16 in the valve body 1 into the groove 10, wherefrom it flows through the space between the surface of the bore 2 and the right (as shown) neck of the spool 3 into the groove 11 and thence through the passage 22 and the pipeline 23 back into the tank 24.

If it is desired to hold the piston 20 in this position for a time, the control apparatus 29 is turned off whereby the pipelines 30 and 31 are connected to the pipeline 39. The spool 3 is returned into the central initial position by the springs 27. The hydraulic fluid forced out by the spool 3 from the chamber C returns into the tank 24 via the passages 32 and 35, the pipelne 30 and the passages in the control apparatus 29.

To cause the piston 20 to make a reverse stroke, the control apparatus 29 is turned on. Now the pipeline 30 remains connected with the pipeline 39 and the pipeline 31 becomes connected with the pipeline 38. The hydraulic fluid delivered by the pump 14 passes through the pipeline 38 into the control apparatus 29 and thence through the pipeline 31 and the passage 33 into the chamber D between the right cover 26 and the end of the spool 3. The fluid pressure shifts the spool 3 to the left against the left spring 27. The fluid forced out from the chamber A by the spool 3 returns into the tank 24 via the passages 32 and 35, the pipeline 30, the passages in the control apparatus 29 and the pipelines 39 and 23.

The spool 3 rests against the left cover 26. In this position, the spool land 5 is somewhat mid-way between the grooves 8 and 9, but separating them, as shown in FIG. 3, the spool 4 uncovers the groove 7 and the land 6 closes the groove 11.

The hydraulic fluid delivered by the pump 14 through the pipeline 13 and the passage 12 into the groove 9 passes through the space between the surface of the bore 2 and the right neck of the spool 3 into the passage 10 and thence through the passage 16 and the pipeline 18 into the space B of the hydraulic cylinder 19. The piston 19 is caused to move to the left and forces out the hydraulic fluid from the space A. This fluid travels through the pipeline 17 and the passage 15 into the groove 8 and thence through the space between the surface of the bore 2 and the left neck of the spool 3, into the groove 7. From there the fluid returns into the tank 24 by way of the passage 21, groove 11, passage 22 and pipeline 23.

Turning on the control apparatus 29 connects the pipelines 30 and 31 with the return pipeline 39. The spool 3 returns into the initial position by the action of the springs 27. The fluid forced out by the spool 3 from the chamber D returns into the tank 24 through the passages 33 and 36, the pipeline 31, the passage in the control apparatus 29 and the pipelines 39 and 23.

In the hydraulic control valve which constitutes the present invention the resistance to the fluid flow is reduced by shortening the fluid paths through the control valve passages and decreasing the number of the path turns, and, in addition, by decreasing the cross-sectional perimeter of the flow in any section thereof. This can be seen in FIGS. 2 and 3 which show, as an example, a longitudinal section of the groove 9 on two planes, both perpendicular to the axis of the bore 2 (see the respective, perpendicular section lines II — II and III — III in FIG. 1), a cross section of the grooves 8,9 and 10 in FIG. 3, and the path of the fluid flow in the control valve from the inlet passage 12 to the outlet passages 15 and 16 which eventually deliver the fluid to the spaces A and B of the hydraulic cylinder 19.

It will be understood that the inventive provision and arrangement of the deep portions of the grooves that communicate with the fluid inlet and the fluid outlet actually constitute means for reducing the hydraulic resistance in the passages by shortening the fluid paths between and through those passages, for decreasing turns in the fluid paths, and for decreasing the cross-sectional perimeters of the fluid flow in any section of the passages.

The less the perimeter of the flow cross section, the larger the Reynolds number (Re) characterizing the flow. With the rate of flow Q constant and kinematic viscosity $\nu$ $$Re = \frac{4Q}{\pi \nu}$$

where $\pi$ = the perimeter of the flow cross-section.

The coefficient $\xi$ of the local resistance throughout the flow path in the control valve is $$\xi = \frac{b}{Re}$$

where $b$ = a constant the value of which depends on the fluid density $\gamma$ and kinematic viscosity $\nu$.

Thus, the larger the number Re, the smaller $\xi$.

The head loss $\Delta p$ due to a local resistance is $$\Delta P = \xi \frac{\nu}{2g} V^2$$

where V = the velocity of the fluid flow.

Decrease of $\xi$ results in decrease of the fluid head loss $\Delta p$.

It is evident that the greater the eccentricity "e", the less is the resistance to the fluid flow in the control valve.

It is also evident that small values — less than 0.2 (R-r) - of the eccentricity "e" have no effect as in this case there is little difference between the hydraulic resistances in the shallow and the deep portions of the circular grooves 7, 8, 9, 10 and 11.

The maximum excentricity is limited by the necessity to provide a clearance between the spool lands 4, 5 and 6 and the grooves 7, 8, 9, 10 and 11 in order to obviate frictional drag during the movement of the spool 3. This consideration is proved by the following examples:

EXAMPLE 1

Dimensions of the hydraulic control valve:
Groove radius R = 2.3 cm
Bore radius r = 1.6 cm
Groove width L = 1 cm
Eccentricity e = 0.1 cm
Velocities $V_1$ and $V_2$ in the minimum and maximum cross sections of the circular groove are $$V_1 = \frac{Q}{F_1} ; V_2 = \frac{Q}{F_2}$$

where
$F_1$ = minimum cross-sectional area of the groove,
$F_2$ = maximum cross-sectional area of the groove.
$F_1 = (R - r - e) L = (2.3 - 1.6 - 0.1) \times 1 = 0.6$ cm²
$F_2 = (R - r + e) L = (2.3 - 1.6 \, 0.1) \times 1 = 0.8$ cm²
Therefore, $$V_1 = \frac{Q}{0.6} ; V_2 = \frac{Q}{0.8}$$

The loss of head in each of the cross sections is $$\Delta P_1 = \frac{V_1^2}{g} = \frac{Q^2}{0.36g} ; \Delta P_2 = \frac{V_2^2}{g} = \frac{Q^2}{0.64g}$$

i.e.

$$\Delta P_2 \cong \frac{\Delta P_1}{2}$$

With this relationship between the values $\Delta p$ of head loss in the deep and the shallow portions of the circular grooves, the fluid will flow through both portions and the flow cross-sectional perimeter will be the same as with a concentric groove.

EXAMPLE 2

The dimensions of the hydraulic control valve are the same as in example 1, but e = 0.2 cm $$V_1 = \frac{Q}{0.5} ; V_2 = \frac{Q}{0.9}$$

$$\Delta P_1 = \frac{Q^2}{0.25g} , \Delta P_2 = \frac{Q^2}{0.81g} . \text{ i.e. } \Delta P_2 \cong \frac{\Delta P_1}{3}$$

It has been found experimentally that with this relationship between the values $\Delta p$ of head loss in the deep and the shallow portions of the circular grooves a high-resistance zone is set up in the shallow portions near the minimum cross sections. The fluid practically does not pass through this zone and, therefore, it can be omitted in calculating the flow cross-sectional perimeter.

It is evident that increase in the eccentricity "e" will cause increase in the area of the high-resistance zone and decrease in the cross-sectional perimeter of the flow.

EXAMPLE 3

The dimensions of the hydraulic control valve are the same as in example 1, but the eccentricity is as great as possible:

$$e = 0.6 \text{ cm. } V_1 = \frac{Q}{0.1} ; V_2 = \frac{Q}{1.3}$$

$$\Delta P_1 = \frac{Q^2}{0.01g} ; \Delta P_2 = \frac{Q^2}{1.69g} ; \Delta P_2 \cong \frac{\Delta P_1}{170}$$

In this case the high-resistance zone is as great as possible for the control valve dimensions involved, whereas the cross-sectional perimeter of the flow is minimum.

It is inexpedient to extend the eccentricity "e" to 0.7 cm as this may result in a frictional drag on the spool lands or else the spool may become struck in the valve body bore.

It is therefore best to maintain the eccentricity "e" within limits that provide for creating a high-resistance zone in the shallow portions of the circular grooves. These limits are characterized by the so called relative eccentricity:

$$\epsilon = \frac{e}{R-2} ; \epsilon_{min} = \frac{0.2}{0.7} \cong 2 ; \epsilon_{max} = \frac{0.6}{0.7} \cong 0.9$$

In the hydraulic control valve constructed according to the present invention hydraulic resistance is considerably lower than in the hydraulic control valves known hitherto. The hydraulic control valve which constitutes the present invention features increased rate of flow and improved applicability.

What is claimed is:

1. A hydraulic control valve comprising: a valve body with a through cylindrical bore having an axis; an axially reciprocable spool accommodated in said bore, defining at least two selectable operative positions with respect to said bore; at least two axially spaced circular grooves formed in said bore, having respective shallow and deep portions, and being eccentric to said axis of the bore; spring means for normally urging said spool into a substantially central initial one of said operative positions; at least two passages provided in said valve body, one of said passages being connected to the first of said grooves and being arranged to admit hydraulic fluid to said spool at a fluid inlet leading into and communicating with said deep portion of the respective one groove, and another at least one passage providing a fluid outlet leading from and communicating with said deep portion of the respective other at least one groove, subsequent ones of said deep portions being in said body at opposite sides of said spool; whereby the hydraulic resistance in said shallow portions is over three times greater than that in said deep portions of the grooves, owing to the eccentricity of the latter, resulting in a high-resistance zone in said shallow portions, and the greater hydraulic resistance therein is sufficient to cause the hydraulic fluid to by-pass said shallow portions while flowing from said fluid inlet to said fluid outlet communicating with said deep portions.

2. The hydraulic control valve as defined in claim 1, wherein the eccentricity of said grooves satisfies the condition $$\frac{e}{R - r} = 0.2 \text{ to } 0.9$$

where $e =$ the eccentricity, $R =$ the radius of said grooves, and $r =$ the radius of said through bore that accomodates said spool;

and wherein said passages communicate with the most eccentric portions of said deep portions of the respective grooves.

* * * * *